United States Patent [19]

Bradley

[11] Patent Number: 4,922,953
[45] Date of Patent: May 8, 1990

[54] VISCOUS LIQUID SUPPLY TANKS

[76] Inventor: Albert J. Bradley, 22 Home Mead Dr., Brislington BS4 5 AP, United Kingdom

[21] Appl. No.: 301,703

[22] Filed: Jan. 26, 1989

Related U.S. Application Data

[63] Continuation-in-part of Ser. No. 159,213, Feb. 23, 1988, abandoned.

[30] Foreign Application Priority Data

Feb. 26, 1987 [GB] United Kingdom ............... 8704577

[51] Int. Cl.$^5$ ............................................. G05D 9/00
[52] U.S. Cl. .................................... 137/386; 118/259; 118/694
[58] Field of Search ................ 118/259, 694; 137/386

[56] References Cited

U.S. PATENT DOCUMENTS 2,762,390  9/1956  Rodenacker ........................ 137/386
3,156,582 11/1964  Parker ............................. 118/694 X
3,373,052  3/1968  Rode ............................... 118/694 X
4,117,800 10/1978  Maus .............................. 118/694

Primary Examiner—Robert G. Nilson
Attorney, Agent, or Firm—Young & Thompson

[57] ABSTRACT

A supply unit 1 is provided for maintaining a desired level of a viscous liquid in a supply tank 2. The liquid is supplied through an inlet passageway 5 down to a horizontal portion 8 and then to a vertical portion 9 communicating with one side of a valve piston 11. When the tank 2 is full of a liquid, this liquid will be drawn up through a passageway 14 in a body 6 by a gear pump 15 which pumps the liquid through a supply line 18 to act on the other face of the piston 11. When the level of liquid within the supply tank 2 falls so that it cannot be drawn up through the passageway 14, the pressure on the upper face of the piston 11 will be relieved and the inlet pressure of the liquid in the inlet passageway 5 will then cause the piston valve 11 to open to allow the liquid to pass through an outlet passageway 13 leading into the supply tank 2.

8 Claims, 2 Drawing Sheets

VISCOUS LIQUID SUPPLY TANKS

The present application is a continuation-in-part of copending application Ser. No. 159,213, filed Feb. 23, 1988, now abandoned.

The invention is concerned with improvements for maintaining a desired level of viscous liquid within a supply tank so that as the liquid is removed for a particular operation the supply will be replenished, when necessary, to keep the level within the supply tank at the required value.

According to the invention there is provided a supply unit for maintaining a desired level of a viscous liquid in a supply tank forming part of the unit and having an inlet for connection to a source of pressurized viscous liquid, the inlet leading to one side of a control valve whose other side communicates with a pump for pumping the viscous liquid, when present within the supply tank above said desired level, to bias the control valve into a closed condition against the pressure of the liquid from the inlet, the valve, when open, allowing communication of the inlet with an outlet passageway to the supply tank.

With such a unit, once the level of liquid falls below the desired level, the pump will be unable to maintain the pressure on the other side of the control valve, with the result that the pressure in the inlet will cause the valve to move to the open condition so that the viscous liquid will then be supplied to the tank through the outlet passageway. When the liquid has been replenished within the supply tank to a sufficient extent, the pump can then drive a portion of that liquid so as to close the control valve.

In the preferred arrangement the valve also has a spring or other biassing member for lightly biassing the valve into the closed position.

The preferred form of pump is a rotary pump which ideally will be a gear pump. Such a pump can be driven by or in association with a feed wheel which dips into the supply tank. The unit is therefore particularly suited for use with an applicator for supplying adhesive liquid to carton flaps or the like. The supply tank can incorporate a heater for the viscous liquid so as to achieve a desired level of viscosity, or indeed to ensure that the liquid does not solidify.

The invention may be performed in various ways and a preferred embodiment thereof will now be described with reference to the accompanying drawings, in which.

Figure 1:
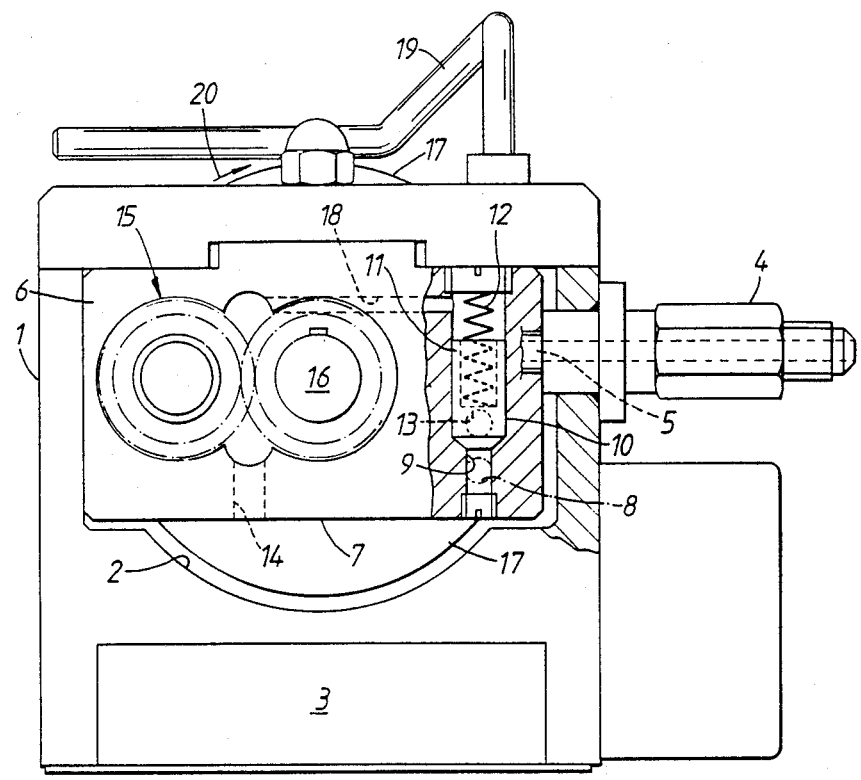
FIG. 1 is a vertical section through a viscous liquid supply unit of this invention.

The unit shown in FIG. 1 incorporates a supply tank 1 providing a reservoir 2 for a quantity of viscous liquid (for example, molten adhesive). A heater 3 is provided in the base of the supply tank to maintain a desired temperature level. The viscous liquid is supplied under pressure through an inlet connection 4 leading to an inlet passageway 5 within a body 6 comprising a control portion for ensuring that the level of liquid within the reservoir 2 is maintained at or above the base 7 of the body 6. The inlet 5 connects with a horizontal portion 8 and thence to a vertical portion 9, terminating at a housing 10 for a valve piston 11. The piston 11 is biased into the closed condition by a spring 12 so as to close an outlet passageway 13 which leads into the reservoir (see FIG. 2).

The supply of pressurized viscous liquid through the connection 4 and inlet 5 will be sufficient to overcome the bias of the spring 12 so that the outlet 13 is uncovered and liquid is supplied to the reservoir 2. When the level reaches the base 7 of the body 6 the liquid can enter a passageway 14 leading to a gear pump 15. One of the gears is carried by a shaft 16 on which is mounted an applicator wheel 17. As the wheel 17 rotates the gear pump 15 will operate to cause the viscous liquid to be driven through a supply line 18 to act on the other face of the piston 11 within the cylinder 10 and ultimately the pressure of the driven liquid will be such as to cause the piston valve 11 to close the outlet passageway 13.

In this instance the applicator wheel 17 is being used to supply viscous liquid adhesive to the flaps of cartons which are being fed past the unit. The carton flaps are folded down by an arm 19 so as to contact the wheel 17 and drive it round in the direction of the arrow 20, thus causing operation of the gear pump 15. As adhesive is removed from the reservoir 2 by application to a succession of carton flaps, the level within the reservoir 2 will fall until such time as the inlet 14 into the body 6 is exposed. The gear pump 15 will then be unable to maintain the pressure within the housing 10 to keep the piston valve 11 in the closed condition and so more liquid will be supplied to the reservoir 2 through the outlet passageway 13.

Figure 2:
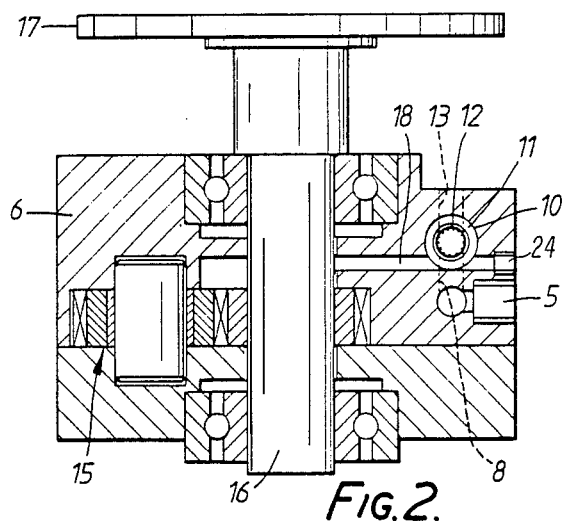
FIG. 2 is a horizontal cross-section through the control portion of the supply unit of FIG. 1.
Figure 3:
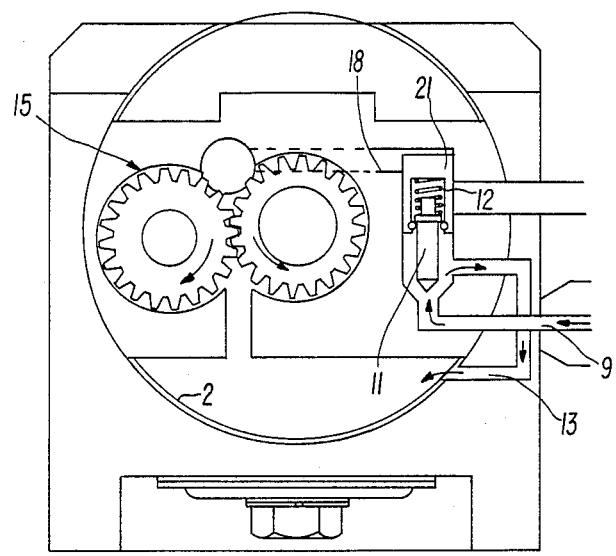
FIG. 3 is a modified view of the apparatus of FIG. 1 to illustrate details of the control valve in a supply state.
Figure 4:
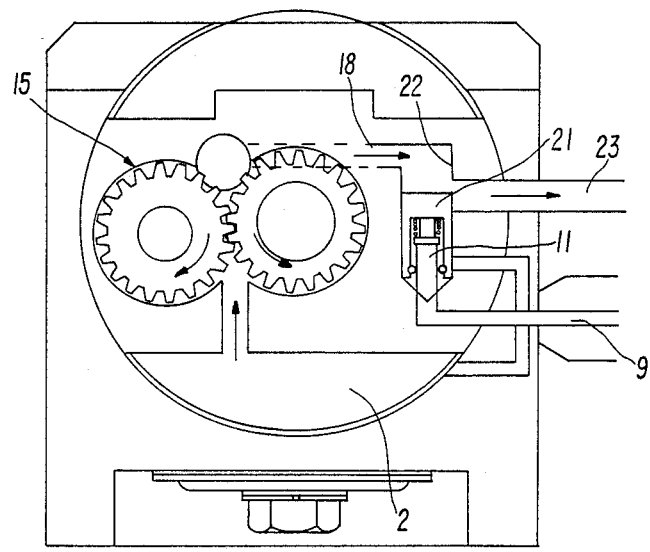
FIG. 4 is a view of the apparatus of FIG. 3 with the control valve in a pressure relief state.

FIGS. 3 and 4 illustrate in detail the design of a control valve which achieves the necessary controlled supply of viscous liquid to the reservoir 2. The valve has a piston 11 biassed towards the supply inlet 9 by spring 12, housed within a valve cylinder 21. When the level of liquid within the reservoir 2 is low the valve cylinder 21 will be at the top of its housing 22, as shown in FIG. 3. The pressure within the supply inlet 9 is then sufficient to overcome the bias of the spring 12 so that the piston 11 rises to allow the viscous liquid to flow through outlet passageway 13 to top up the reservoir 2. However, when the reservoir has filled sufficiently to cause the liquid to be drawn up by the gear pump 15, pressure will be applied to the valve cylinder 21, by pumping of the liquid through passageway 18 to the housing 22. This drives the valve cylinder 21 down, together with the piston 11 to close off the supply inlet 9. At the same time a pressure relief outlet 23, leading to the reservoir 2, is uncovered by the valve cylinder 21, so that the pressure of the gear pump 15 is relieved. Of course, a similar such outlet 24, as shown in FIG. 2, is provided in the embodiment of FIGS. 1 and 2. Then the level of liquid within the reservoir falls again, so that the gear pump 15 ceases to drive liquid through the passageway 18 the combined effort of the spring 12 and the pressure in the supply inlet 9 will cause the valve cylinder 21 to rise to close off relief outlet 23 and allow the supply inlet to open to cause replenishment of the liquid into the reservoir 2.

What is claimed is:

1. A liquid supply tank having an inlet for connection to a source of pressurized liquid and incorporating maintenance means for maintaining a desired level of a viscous liquid within said tank, said maintenance means comprising a pump and a two-position control valve, the control valve having connections to two operational sides thereof, said inlet being connected to one of said sides of the control valve, said pump having an input and an output, the pump output being connected to the other of said sides of the control valve, and an outlet passageway leading from the housing of said valve to the interior of the supply tank and arranged to be interconnected with said inlet when said control valve moves to the open position, the pump input communicating with the interior of the supply tank, such that the pump will pump the viscous liquid, when present within the supply tank above said desired level, to bias the control valve into its closed position against the pressure of the liquid from the inlet, said bias being relieved when the liquid falls below said desired level, so that the valve will move to the open position to allow communication of the inlet with the outlet passageway to the supply tank and a relief passageway leading from the control valve housing which will interconnect said pump outlet with said supply tank when said control valve moves to the closed position.

2. A supply unit according to claim 1, wherein said valve also incorporates a biassing member for lightly biassing the valve into the closed position.

3. A supply unit according to claim 1, wherein said pump is a rotary pump.

4. A supply unit according to claim 3, incorporating a feed wheel which dips into the supply tank, said pump being driven together with said feed wheel.

5. A supply unit according to claim 3, wherein said pump is a gear pump.

6. A supply unit according to claim 1, wherein the pump input opens at said desired level within the supply tank.

7. A supply unit according to claim 1, wherein said supply tank incorporates a heater for the viscous liquid.

8. A supply unit according to claim 2, wherein the biassing member is a spring, and the control valve comprises a piston and cylinder unit, biassed apart by said biassing spring, and located within said housing for movement of said piston into and out of registration with said supply inlet, and for movement of said cylinder to uncover and cover said relief passageway.

* * * * *